United States Patent [19]

Mitomo et al.

[11] Patent Number: 4,745,522
[45] Date of Patent: May 17, 1988

[54] GAS-INSULATED SWITCHGEAR APPARATUS

[75] Inventors: Toshihide Mitomo, Hitachi; Satoshi Miwada, Ibaraki; Shigetaka Takeuchi, Hitachi, all of Japan

[73] Assignee: Hitachi, Ltd., Tokyo, Japan

[21] Appl. No.: 942,636

[22] Filed: Dec. 17, 1986

[30] Foreign Application Priority Data

Dec. 17, 1985 [JP] Japan .................................. 60-282034

[51] Int. Cl.⁴ ............................................. H02B 1/04
[52] U.S. Cl. ................. 361/341; 200/148 F; 361/333; 361/335
[58] Field of Search ........... 200/148 R, 148 D, 148 E, 200/148 F, 50 AA; 361/332, 333, 335, 341, 361, 363

[56] References Cited

U.S. PATENT DOCUMENTS 4,215,256 7/1980 Sakaguchi et al. ............. 200/148 D

FOREIGN PATENT DOCUMENTS 0062006 5/1981 Japan .
0015410 1/1983 Japan .

Primary Examiner—A. D. Pellinen
Assistant Examiner—Gregory D. Thompson
Attorney, Agent, or Firm—Antonelli, Terry & Wands

[57] ABSTRACT

A gas insulated switchgear apparatus, in particular a phase-separated, double main bus-type switchgear apparatus, in which first and second phase-separated main buses are interchangeable and are arranged in horizontal planes in such a manner as to reduce the space needed for the apparatus.

8 Claims, 3 Drawing Sheets

FIG. I

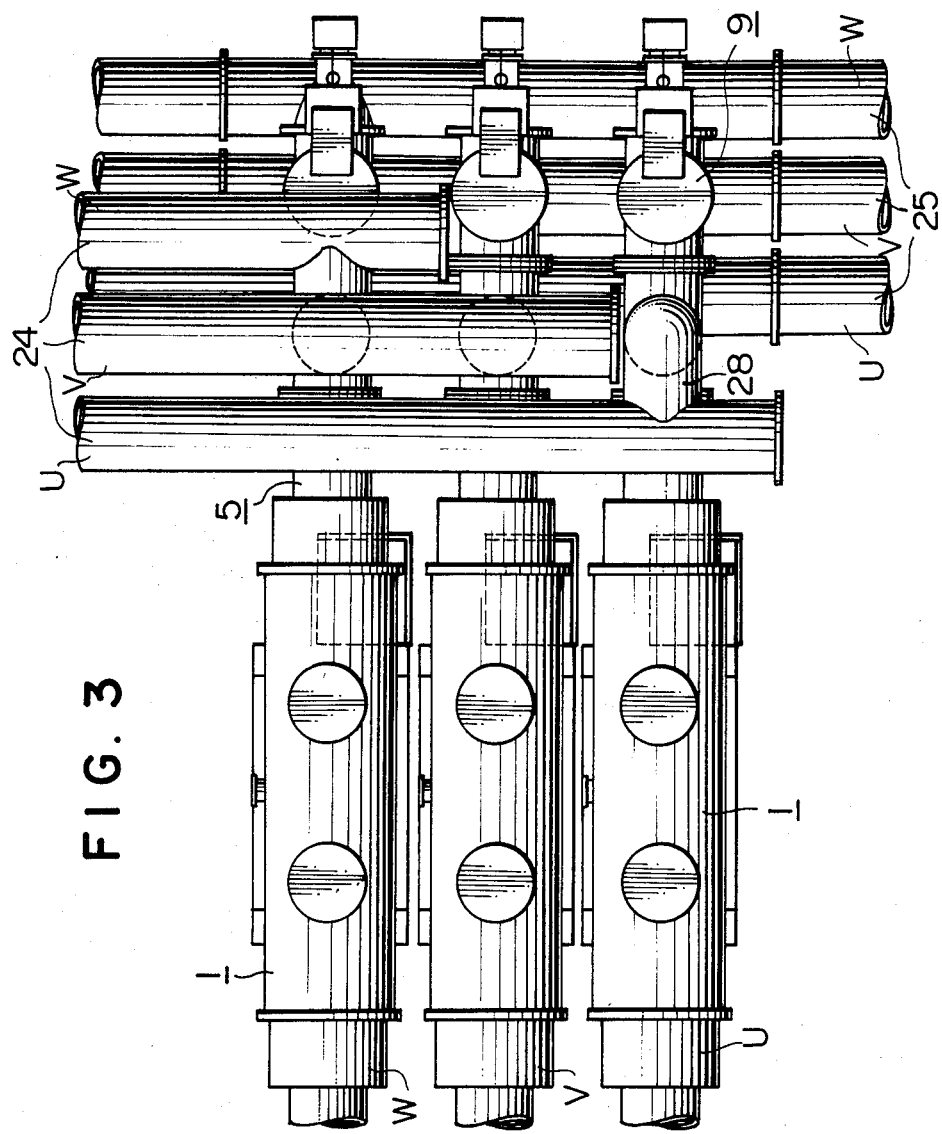

GAS-INSULATED SWITCHGEAR APPARATUS

BACKGROUND OF THE INVENTION

This invention relates to a gas-insulated switchgear apparatus, especially, a phase-separated, double main bus type gas-insulated switchgear apparatus.

Typically, in gas-insulated switchgear apparatus of a double main bus type, gas-insulated circuit breakers are arranged horizontally and one end of each gas-insulated circuit breaker is connected to first and second sets of main buses in succession through breakers or disconnecting switches. Accordingly, the apparatus extends in the axial direction of the gas-insulated circuit breaker.

In conventional gas-insulated switchgear apparatus, main buses are used in a three-phase common busbar type or a phase-separated type. For example, three-phase common busbars are used in the gas-insulated switchgear apparatus in a way as disclosed in, for example, JP-A-56-62006, according to which gas-insulated circuit breakers for U, V and W phases are juxtaposed on a horizontal plane, each having one end connected to a coupling bus. First and second three-phase common main buses are arranged under the coupling buses to lie on a horizontal plane which is orthogonal to the horizontal plane, and a conductor for each phase of each of the first and second three-phase common main buses is connected to a conductor of the coupling bus for each phase through a disconnecting switch. Phase-separated main buses are typically used in the gas-insulated switch-gear apparatus as disclosed in JP-A-58-15410, which shows gas-insulated circuit breakers for three phases in the same horizontal plane, each having one end connected to a coupling bus. First phase-separated main buses are arranged above the coupling buses to lie on a first horizontal plane which is orthogonal to the coupling buses, second phase-separated main buses are arranged under the coupling buses to lie on a second horizontal plane which is orthogonal thereto, and the first and second phase-separated buses are connected to the gas-insulated circuit breakers through the coupling buses and disconnecting switches.

Because of the grouped three-phase main buses in previous switchgear apparatus, the overall apparatus size can advantageously be reduced. However, if a conductor of any phase becomes defective, it is difficult to inspect and repair this defective conductor without having some influence upon the conductors of the remaining phases. To eliminate this problem, the main buses for three phases can be separated as is the case with phase separation in the juxtaposed gas-insulated circuit breakers, but this means an increase in installation space.

However, when incorporating the upper set of first phase-separated main buses arranged above the installation horizontal plane for the gas-insulated circuit breakers and the lower set of second phase-separated main buses arranged below that installation horizontal plane into the gas-insulated switchgear apparatus, it is impossible to connect the conductors of the first and second phase-separated main buses to the coupling buses through the disconnecting switches by maintaining identiy of U, V and W phase sequence between the upper and lower sets. This is because of the limited arrangements available for the switches. As a result, an operator might erroneously recognize the phase of the main buses during maintenance inspection and repair. To solve this problem, the upper set of first phase-separated main buses and the lower set of second phase-separated main buses can be arranged in the same sequence of phases. This expedient, however, requires that the switches for connection or disconnection of the conductors be arranged in an artificially sophisticated fashion and that the distance between the horizontal plane for the upper or lower set of phase-separated main conductors and the installation horizontal plan for the gas-insulated circuit breakers be large, thus increasing the overall size, especially height, of the gas-insulated switchgear apparatus with a resultant degradation in vibration-proofing characteristics.

To cope with this problem, both the first and second phase-separated main buses may be juxtaposed under the installation horizontal plane for the gas-insulated circuit breakers. This arrangement however can not be realized without increasing the overall size in the direction where the phase-separated main buses are juxtaposed on the side of one end of each gas-insulated circuit breaker. This space must be large enough for drawing out or removing the gas-insulated circuit breakers and phase-separated main buses or the phase-separated main buses themselves and will increase the size of the gas-insulated switchgear apparatus, requiring a larger building for accommodating a larger-sized apparatus and a large ground area for foundation of the large building. In addition, since the phase-separated main buses are positioned differently, the length of the coupling bus connected to one end of the gas-insulated circuit breaker differs from phase to phase. Therefore, the individual coupling buses are not interchangeable and are unsuitable for mass production.

SUMMARY OF THE INVENTION

An object of this invention is to provide a gas-insulated switchgear apparatus which can reduce the space requirements of the first and second phase-separated main buses while providing a space sufficient for inspection of gas-insulated circuit breakers and other components.

Another object of this invention is to provide a gas-insulated switchgear apparatus wherein sets of first and second phase-separated main buses are of the same construction and interchangeable, contributing to simplification of production of the apparatus.

According to this invention, a gas-insulated switchgear apparatus comprises a set of gas-insulated circuit breakers for three phases juxtaposed on a first horizontal plane, first phase-separated main buses respectively at one end of the set of gas-insulated circuit breakers and arranged on a second set of horizontal planes at several different levels spaced from the first horizontal plane, and second phase-separated main buses respectively at the same end of the set of gas-insulated circuit breakers as the first buses and arranged on a third set of horizontal planes at several different levels spaced from the first horizontal plane. The apparatus further comprises a coupling bus and switches for connecting each gas-insulated circuit breaker to each first phase-separated main bus and each second phase-separated main bus for the same phase, such that the coupling buses for respective phases have the same length. First switches for respective phases of one bus lie on a common vertical plane, and second switches for respective phases of the second bus lie on another common vertical plane. The first phase-separated main buses for three phases closer to the set of gas-insulated circuit breakers are installed on upper horizontal planes of different levels above the first switches, and the second phase-separated main buses for three phases more remote from the gas-insulated circuit breakers are installed on lower horizontal planes of different levels under the second switches.

BRIEF DESCRIPTION OF THE DRAWINGS

FIG. 3 is a plan view of FIG. 1.

DESCRIPTION OF THE PREFERRED EMBODIMENTS

Figure 1:
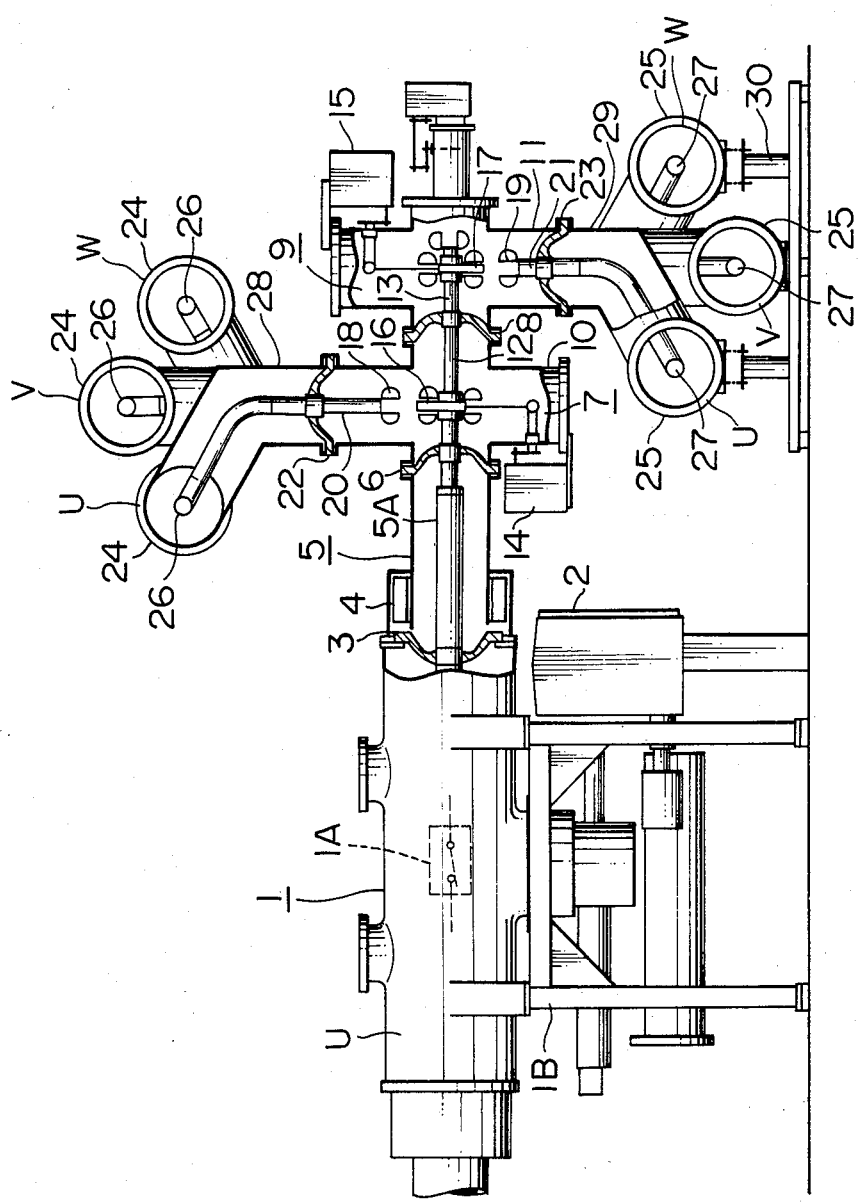
FIG. 1 is a schematic front view, partly sectioned, showing a gas-insulated switchgear apparatus according to an embodiment of the invention.
Figure 2:
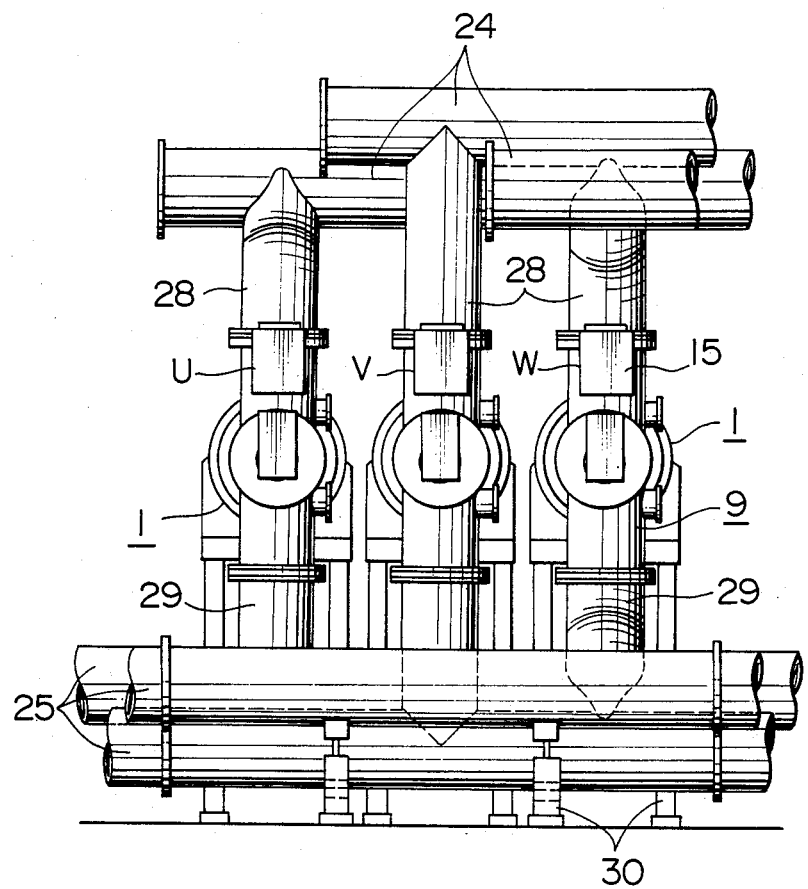
FIG. 2 is a side view as viewed from the right in FIG. 1.

Referring now to FIGS. 1 to 3, there is illustrated a gas-insulated switchgear apparatus of phase-separated double bus type embodying the invention. A set of U, V and W phase gas-insulated circuit breakers 1 for connection to peripheral devices through bushings and cable heads are arranged on the same horizontal plane in substantially parallel relationship with each other. Each gas-insulated circuit breaker 1 has at least one breaking element 1A in a cylindrical container which is supported substantially horizontally. As well known in the art, a movable contact of the breaking element 1A is operated to open or close by means of a mechanism built in an operation box 2 or a driver unit.

The gas-insulated circuit breaker 1 for each phase is supported on a suitable frame 1B and its axially opposite ends are gas-sectioned by insulating spaces 3. Connected to one end of each gas-insulated circuit breaker 1 is a coupling bus 5 having one end gas-tightly sealed by the insulating spacer 3 and the other end gas-sectioned by an insulating spacer 6. The coupling bus 5 includes an internal coupling conductor 5A and a current transformer 4 fitted on the outer circumferential surface of the coupling bus. Each coupling bus for each phase is the same length to ensure exchangeability between the coupling buses for respective phases. Each coupling bus for each phase is connected to a first disconnecting switch 7 through the insulating spacer 6 and also to a second disconnecting switch 9 through an insulating spacer 8. Accordingly, the first switches 7 for respective phases lie in one vertical plane and the second switches 9 for respective phases lies on another vertical plane, these vertical planes being orthogonal to the horizontal plane on which the set of gas-insulated circuit breakers 1 are juxtaposed. A first phase-separated main bus 24 connects to the gas-insulated circuit breaker 1 through the first switch 7, and a second phase-separated main bus 25 connects to the same gas-insulated breaker 1 through the second switch 9 as will be described later. The switches 7 and 9, whose internal structure will be described later, have enclosures 10 and 11, respectively. Each of the enclosures 10 and 11 has a substantially longitudinal section and has vertically extending arms. One vertically extending arm of the enclosure 10, perpendicular to an extension of the axial line of the gas-insulated circuit breaker 1, forms a connection part to the first phase-separated main bus 24 and one vertically extending arm of the enclosure 11 likewise forms a connection part to the second phase-separated main bus 25. The switch 7 is held such that its connection part is directed upwards and conversely, the switch 9 is held with its connection part directed downwards. An electrical conductor 12 of the switch 7 is horizontally supported within the enclosure 10 by means of a suitable insulating support and an electrical conductor 13 is similarly supported within the enclosure 11. The conductor 12 connects to the coupling conductor 5A through the insulating spacer 6 and the conductor 13 connects to the conductor 12 through the insulating spacer 8. The electrical conductor 12 carries a movable contact 16 which can be operated to slide vertically by means of a manipulator 14 provided on the side opposite to the connection part of the enclosure 10. Similarly, the electrical conductor 13 carries a movable contact 17 which can be operated to slide vertically by means of a manipulator 15 provided on the side oposite to the connection part of the enclosure 11. A stationary contact 18 opposing the movable contact 16 is mounted to one end of a branch conductor 20 extending to the phase-separated main bus 24 for each phase, and a stationary contact 19 opposing the movable contact 17 is mounted to one end of a branch conductor 21 extending to the phase-separated main bus 25 for each phase. The connection parts of the enclosures 10 and 11 are gas-sectioned by insulating spacers 22 and 23 which support the branch conductors 20 and 21. It should be understood that the above arrangement of the switches 7 and 9 permits the the switches to be of the same construction and also permits easy separation of the movable contacts 16 and 17, illustrated in FIG. 1 from the stationary contacts 18 and 19, by using the manipulators 14 and 15 provided on the side opposite to the branch conductors 20 and 21.

Considering the phase-separated main buses, it will be seen from the drawings that the respective first phase-separated main buses 24 for a respective phase being close to the respective gas-insulated circuit breakers 1 are arranged above the switch 7, that is, they are arranged in different horizontal planes which are above and spaced from the installation horizontal planes for the respective gas-insulated circuit breakers 1 and conversely, the respective second phase-separated main buses 25 for respective phases more remote from the respective gas-insulated circuit breakers 1 are arranged below the switch 9, that is, they are arranged in different horizontal planes which are below and spaced from to the installation horizontal planes for the respective gas-insulated circuit breakers 1. In addition, the respective first phase-separated main buses 24 converge at a vertical plane in which the respective switches 7 lie and likewise, the respective second phase-separated main buses 25 similarly converge at a vertical plane in which the respective switches 9 lie, leaving behind a space which is below the coupling bus 5 and between the set of gas-insulated circuit breakers 1 and the set of second phase-insulated main buses 25. This space may conveniently be utilized for inspection of the operation box 2 for the gas-insulated circuit breaker 1 and of other components of apparatus or as a working space for moving the phase-separated main buses 25.

For each phase, the first and second phase-separated main buses 24 and 25 respectively connect to branch buses 28 and 29 coupled to the connection parts of the breaker enclosures 10 and 11, thereby forming unitary structures, and main bus conductors 26 and 27 electrically connect to the branch conductors 20 and 21 extending to the switches 7 and 9.

In another arrangement for reducing the installation spacing, the respective phase-separated main buses 24 for three phases may possibly be juxtaposed on the same horizontal plane above the installation horizontal plane for the gas-insulated circuit breaker 1, converging at a common vertical plane and similarly the respective phase-separated main buses 25 for three phases may be juxtaposed on the same horizontal plane below that installation horizontal plane, converging at another common vertical plane. But this arrangement requires, a larger width for the juxtaposition of the buses in the same horizontal plane. Accordingly, in the illustrated embodiment, only one phase-separated main bus for a specified phase is arranged on an installation horizontal plane which is different from that for the other two phase-separated main buses for the remaining phases, so that the respective phase-separated main buses for three phases are located at apices of a triangle as viewed in FIG. 1. In particular, the triangle is an equilateral triangle having a base longer than the remaining sides and the respective phase-separated main buses are located at apices of this equilateral triangle, thereby avoiding a considerable increase in the installation width without requiring a large difference in levels between the installation horizontal planes for respective phases. Accordingly, the arrangement of the first phase-separated main buses 24 is defined by an equilateral triangle existing above the installation horizontal plane for the gas-insulated circuit breaker 1, and the arrangement of the second phase-separated main buses 25 is defined by an inverted equilateral triangle existing below that installation horizontal plane. Therefore, the two arrangements are symmetrical with each other with respect to that installation horizontal plane, and interchangeability therebetween simplifies production of the phase-separated main buses. Because of this equilateral triangular arrangement of the set of first phase-separated main buses 24, the buses 24 respectively merge into a straight branch bus 28 for central phase and bent or arcuate branch buses 28 for lefthand and righthand phases, the respective branch buses 28 branching upwards from the respective switches 7 lying on the same vertical plane which is orthogonal to the installation horizontal plane for the set of juxtaposed three-phase gas-insulated circuit breakers 1. Likewise, because of the equilateral triangular arrangement of the set of second phase-separated main buses 25, the buses 25 respectively merge into a straight branch bus 29 for central phase and bent or arcuate branch buses 29 for lefthand and righthand phases, the respective branch buses 29 branching downwards from the switches 9 for respective phases lying on the same vertical plane. The upper arrangement of the phase-separated main buses 24 for respective phases is supported by the branch buses 28 and the lower arrangement of the phase-separated main buses 25 for respective phases is supported on the foundation through supporting members 30.

The gas-insulated circuit breakers 1 for three phases are juxtaposed to sequence of U, V and W phases on the same horizontal plane, and the first and second phase-separated main buses 24 and 25 respectively connected to the gas-insulated circuit breakers 1 through the switches 7 and 9 are also arranged in sequence of U, V and W phases, starting from a phase close to the gas-insulated circuit breaker 1. Specifically, assuming that the illustrated gas-insulated circuit breaker 1 in the example of FIG. 1 is for U phase, the first and second phase-separated main buses 24 and 25 on the lefthand side are for U phase, those at the center are for V phase and those on the righthand side are for W phase. This makes it possible for an inspector to correctly recognize the corresponding phases upon maintenance inspection or repair of the phase-separated main buses.

In the gas-insulated switchgear apparatus of the invention described so far, the set of gas-insulated circuit breakers 1 for respective phases are juxtaposed horizontally but alternatively, they may be juxtaposed vertically. In any case, a similar arrangement can be obtained by connecting respective horizontally extending coupling buses 5 and respective switches 7 and 9 to one end of the set of gas-insulated circuit breakers 1, arranging the set of phase-separated main buses 24 close to the gas-insulated circuit breakers 1 above the coupling conductor 5A and electrical conductors 12 and 13, and arranging the set of phase-separated main buses 25 remote from the gas-insulated circuit breakers 1 below the coupling conductor 5A and electrical conductors 12 and 13.

As described above, according to the invention, the set of first phase-separated main buses and the set of second phase-separated main buses are connected to one end of the set of gas-insulated circuit breakers through the coupling buses and switches in such a manner that the first phase-separated main buses for respective phases close to the gas-insulated circuit breakers branch upwards from the respective switches on a common vertical plane and the second phase-separated main buses for respective phases remote from the gas-insulated circuit switches branch downwards from the respective breakers on another common vertical plane. Therefore the individual first phase-separated main buses as well as the individual second phase-separated main buses can partially overlap in one direction (vertical direction in the illustrated embodiment) to thereby reduce the size of the gas-insulated switchgear apparatus in the other direction (horizontal direction in the illustrated embodiment) in which the first phase-separated main buses as well as the second phase-separated main buses are juxtaposed. In addition, a space can be reserved between the set of gas-insulated circuit breakers and the lower set of second phase-separated main buses and can be efficiently utilized for maintenance inspection. Further, the coupling bus and the first and second switches as well as the first and second phase-separated main buses can be of the same construction for respective phases. This simplifies production of the gas-insulated switchgear apparatus.

We claim:

1. A gas-insulated switchgear apparatus comprising:
   gas-insulated circuit breakers for three phases disposed with an axis in a horizontal plane and having one axial end in a horizontal direction connected with a coupling bus;
   first phase-separated main buses disposed in a first set of horizontal planes at different levels spaced from said horizontal plane, and second phase-separated main buses disposed in a second set of horizontal planes at different levels spaced from said horizontal plane; and
   first switch means for each phase for connecting or disconnecting each gas-insulated circuit breaker and each first phase-separated main bus for the same phase, and a second switch means for each phase for connecting or disconnecting each gas-insulated circuit breaker and each second phase-separated main bus for the same phase;
   said coupling buses for respective phases having the same length, said first switch means for respective phases laying in a common vertical plane and said second switch means for respective phases laying in a second common vertical plane, said first phase-separated main buses for three phases being positioned at the side of said gas-insulated circuit breakers and respectively arranged on the first set of horizontal planes at different levels above said first switch means, and said second phase-separated main buses being separated from said gas-insulated circuit breakers and respectively arranged on the second set of horizontal planes at different levels below said second switch means.

2. A gas-insulated switchgear apparatus according to claim 1 wherein first phase-separated main buses for two phases are in a horizontal plane which is closer to said gas-insulated circuit breakers than the horizontal plane on which the remaining first phase-separated main bus for one phase is arranged, second phase-separated main buses for two phases are in a horizontal plane which is closer to said gas-insulated circuit breakers than the horizontal plane on which the remaining second phase-separated main bus for one phase is arranged, and said first and second sets of horizontal planes are symmetrical to each other with respect to said horizontal plane.

3. A gas-insulated switchgear apparatus according to claim 1 wherein said first phase-separated main buses are positioned at one side of said gas-insulated circuit breakers and are located at apices of an equilateral triangle having a longer base than the remaining sides, and said second phase-separated main buses separated from said gas-insulated circuit breakers are located at apices of an inverted equilateral triangle having a longer base than the remaining sides.

4. A gas-insulated switchgear apparatus according to claim 1 wherein said first and second phase-separated main buses are arranged in the same phase sequence as that of said gas-insulated circuit breakers.

5. A gas-insulated switchgear apparatus according to claim 1 wherein said first switch means has a movable contact which is operated vertically by a manipulator provided on a side opposite to said first phase-separated buses main, and said second switch means has a movable contact which is operated vertically by a manipulator provided at a side of said second phase-separated main buses.

6. A gas-insulated switchgear apparatus according to claim 1, wherein said first switch means is gas-tightly sealed from said coupling bus, said first phase-separated main bus and said second switch means through insulating spacers, and said second switch means is gas-tightly sealed from said second phase-separated main bus and said first switch means through insulating spacers.

7. A gas-insulated switchgear apparatus according to claim 1, where for each phase, said first switch means has an enclosure with a longitudinal section having a vertically extending connecting part coupled to said first phase-separated main bus through a branch bus, and said second switch means has an enclosure with a longitudinal section having a vertically extending connection part coupled to said second phase-separated main bus through a branch bus.

8. A gas-insulated switchgear apparatus comprising:
gas-insulated circuit breakers for three phases disposed with an axis in a horizontal plane and having one axial end in a horizontal direction connected with a coupling bus;

first phase-separated main buses arranged on a first set of horizontal planes at different levels spaced from said horizontal plane, and second phase-separated main buses arranged on a second set of horizontal planes at different levels spaced from said horizontal plane; and a first switch means for each phase for connecting or disconnecting each gas-insulated circuit breaker and each first phase-separated main bus for the same phase, and second switch means for each phases for connecting or disconnecting each gas-insulated circuit breaker and each second phase-separated main bus for the same phase;

said coupling buses for respective phases having the same length, said first switch means for respective phases laying in a common vertical plane and having a movable contact which is operated vertically by a manipulator provided on a side opposite to said first phase-separated main buses, and said second switch means for respective phases laying in a second common vertical plane and having a movable contact which is operated vertically by a manipulator provided on a side opposite to said second phase-separated main buses, said first phase-separated main buses for three phases being positioned at one side of said gas-insulated circuit breakers and respectively arranged on said first set of planes above said first switch means respectively connected to branch buses in such a manner that said first phase-separated main buses are located at apices of an equilateral trinagle having a longer base than the remaining sides and said second phase-separated main buses for three phases being separated from said gas-insulated circuit breakers and respectively arranged on said second set of planes below said second switch means respectively connected to branch buses in such a manner that said second phase-separated main buses are located at apices of an inverted equilateral triangle having a longer base than the remaining sides.

* * * * *